US009292311B2

(12) United States Patent
Chun et al.

(10) Patent No.: US 9,292,311 B2
(45) Date of Patent: Mar. 22, 2016

(54) METHOD AND APPARATUS FOR PROVIDING SOFTWARE PROBLEM SOLUTIONS

(71) Applicant: International Business Machines Corporation, Armonk, NY (US)

(72) Inventors: Liu Ka Chun, Hong Kong (HK); Yeung Wai Kit, Hong Kong (HK); Feng Yue Qin, Hong Kong (HK); Kuan Kam Sing, Hong Kong (HK); Lee Ho Wang, Hong Kong (HK)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 14/134,910

(22) Filed: Dec. 19, 2013

(65) Prior Publication Data
US 2014/0180999 A1 Jun. 26, 2014

(30) Foreign Application Priority Data
Dec. 20, 2012 (CN) .......................... 2012 1 0560591

(51) Int. Cl.
*G06F 17/00* (2006.01)
*G06N 7/00* (2006.01)
*G06N 7/08* (2006.01)
*G06F 9/44* (2006.01)

(52) U.S. Cl.
CPC .................................. *G06F 9/4446* (2013.01)

(58) Field of Classification Search
None
See application file for complete search history.

(56) References Cited

U.S. PATENT DOCUMENTS

| 6,029,258 | A | 2/2000 | Ahmad | |
|---|---|---|---|---|
| 6,184,880 | B1 * | 2/2001 | Okada | G06F 9/45512 714/E11.217 |
| 6,327,589 | B1 * | 12/2001 | Blewett | G06F 17/30864 |
| 6,671,818 | B1 * | 12/2003 | Mikurak | G06Q 10/06 714/4.21 |

(Continued)

FOREIGN PATENT DOCUMENTS

| EP | 0915422 A1 | 5/1999 |
|---|---|---|
| WO | 9825195 A2 | 6/1998 |

OTHER PUBLICATIONS

Integration of Historic Building Information Modeling (HBIM) and 3D GIS for recording and managing cultural heritage sites Dore, C.; Murphy, M. Virtual Systems and Multimedia (VSMM), 2012 18th International Conference on Year: 2012 pp. 369-376, DOI: 10.1109/VSMM.2012.6365947 Referenced in: IEEE Conference Publications.*

(Continued)

*Primary Examiner* — Michael B Holmes
(74) *Attorney, Agent, or Firm* — Cantor Colburn LLP; Rahan Uddin

(57) ABSTRACT

In one embodiment, a method for providing software problem solutions includes: obtaining a software problem of a questioning user; obtaining from other users multiple solutions for solving the software problem, each of the multiple solutions being provided as a recording script, and each of the recording scripts includes a user operation sequence and a corresponding semantic node sequence, wherein one or more semantic nodes in each of the semantic node sequences describes meanings of user operations; analyzing, by a computer processor, semantic node sequences in the recording scripts of the multiple solutions to determine recommendation degree information for the multiple solutions; and outputting the multiple solutions and the associated recommendation degree information.

20 Claims, 4 Drawing Sheets

(56) References Cited

U.S. PATENT DOCUMENTS

| | | | |
|---|---|---|---|
| 6,922,723 B1* | 7/2005 | Sharp | G06F 9/44505 709/200 |
| 7,133,834 B1* | 11/2006 | Abelow | G06Q 10/101 705/1.1 |
| 7,191,364 B2 | 3/2007 | Hudson et al. | |
| 7,576,877 B2* | 8/2009 | Tanaka | H04N 1/00408 358/1.1 |
| 7,620,565 B2* | 11/2009 | Abelow | G06Q 10/101 705/500 |
| 7,620,718 B2* | 11/2009 | Motoyama | G06Q 10/10 709/219 |
| 7,925,608 B2* | 4/2011 | Rohlfing | H04L 41/16 706/47 |
| 7,984,007 B2 | 7/2011 | Reumann et al. | |
| 8,433,711 B2* | 4/2013 | Odom | G06F 19/325 707/706 |
| 8,447,720 B1* | 5/2013 | Rubin | G06N 5/025 706/46 |
| 8,781,882 B1* | 7/2014 | Arboletti | G06Q 10/0639 705/7.11 |
| 8,881,303 B2* | 11/2014 | Liu | G06F 8/30 715/704 |
| 2002/0087949 A1 | 7/2002 | Golender et al. | |

OTHER PUBLICATIONS

Rapid Deployment of SOA Solutions via Automated Image Replication and Reconfiguration Sethi, M.; Kannan, K.; Sachindran, N.; Gupta, M. Services Computing, 2008. SCC '08. IEEE International Conference on Year: 2008, vol. 1 pp. 155-162, DOI: 10.1109/SCC.2008.96 Referenced in: IEEE Conference Public.*

An efficient code update solution for wireless sensor network reprogramming Mazumder, B.; Hallstrom, J.O. Embedded Software (EMSOFT), 2013 Proceedings of the International Conference on Year: 2013 pp. 1-10, DOI: 10.1109/EMSOFT.2013.6658582 Referenced in: IEEE Conference Publications.*

Applying semantic web and user behavior analysis to enforce the intrusion detection system Chan, Y.-T.F.; Shoniregun, C.A.; Akmayeva, G.A.; Al-Dahoud, A. Internet Technology and Secured Transactions, 2009. ICITST 2009. International Conference pp. 1-5, DOI: 10.1109/ICITST.2009.5402616 Referenced in: IEEE Conference Publications.*

* cited by examiner

METHOD AND APPARATUS FOR PROVIDING SOFTWARE PROBLEM SOLUTIONS

PRIORITY

This application claims priority to Chinese Patent Application No. 201210560591.9, filed Dec. 20, 2012, and all the benefits accruing therefrom under 35 U.S.C. 119, the contents of which in their entirety are herein incorporated by reference.

BACKGROUND

Embodiments of the present invention relate to providing software help information and, more specifically, to a method and apparatus for providing software problem solutions.

Developments of information technology are providing more and more software products. Correspondingly, when using these software products, a user may fact more and more problems, such as "Is there a way to move existing Smart-Cloud iNotes emails to a Folder?", "Why do I obtain an error when I try to send an email?", etc. When a software problem arises, a user usually tries to solve it in the following manners:

A first manner often used is to search and explore help articles related to the software in a knowledge base so as to self-help in addressing the current software problems. However, in most cases, a user neither has enough knowledge to solve a problem that arises nor can identify a correct solution from various help information. On the other hand, although materials in a knowledge base are updated using plenty of network sources, the knowledge base still cannot cover all the problems the user may face. Thus, this manner of potential problem-solving cannot effectively solve software problems the user may face.

Another manner of potential problem-solving is to seek help from a software help desk when the software problem arises. Then, technical staff of the help desk may use a telephone or some remote control software to communicate with the user so as to solve the software problem. However, this requires a one-to-one technical support, which has a high cost. Furthermore, due to limitations of remote communication and the help desk's resultant limited knowledge of the problem, the help desk sometimes cannot fully understand the problem and the requirements of the user.

In a third manner of potential problem-solving, the user may post the problem to an Internet forum to solicit solutions. This manner requires a higher technical level of the user, because the user needs to have enough computer technical knowledge to describe the problem, understand solutions provided by other users, and apply the solutions to his own computer. Furthermore, other users of the forum may provide various different solutions, some of which may be provided as to different versions or different application environments, and some may even be wrong solutions. This makes it difficult to identify a correct solution from the various solutions provided.

Some dedicated help platforms and help systems exist to solve software problems. For instance, under a help platform, the user can select his own problem from a menu or manually input his own problem using a natural language string. Then, the help platform generates a value corresponding to the problem inputted by the user, and locates a solution of the problem in an information database using that value. However, such a help platform can only identify and solve some predefined problems rather than cover all problems of a user. Under another help platform, the context of a problem is analyzed to filter out keywords by which an appropriate solution suggestion is searched in a help system. Using such a help platform, a user can relatively easily obtain a solution of a software problem. However, contents supported by the help platform are limited to contents relating to predefined keywords, which cannot fully cover the user's problems. Other existing help platforms have shortcomings in other respects.

SUMMARY

In one embodiment, a method for providing software problem solutions includes: obtaining a software problem of a questioning user; obtaining from other users multiple solutions for solving the software problem, each of the multiple solutions being provided as a recording script, and each of the recording scripts includes a user operation sequence and a corresponding semantic node sequence, wherein one or more semantic nodes in each of the semantic node sequences describes meanings of user operations; analyzing, by a computer processor, semantic node sequences in the recording scripts of the multiple solutions to determine recommendation degree information for the multiple solutions; and outputting the multiple solutions and the associated recommendation degree information.

In another embodiment, an apparatus for providing software problem solutions includes: a problem obtaining unit configured to obtain a software problem of a questioning user; a solution obtaining unit configured to obtain, from other users, multiple solutions for solving the software problem, each of the multiple solutions being provided as a recording script, and each of the recording scripts includes a user operation sequence and a corresponding semantic node sequence, wherein one or more semantic nodes in each of the semantic node sequences describes meanings of user operations; a solution analyzing unit configured to analyze the semantic node sequences in the recording scripts of the multiple solutions to determine recommendation degree information; and a providing unit configured to output the multiple solutions and the associated recommendation degree information.

In yet another embodiment, a computer program product includes a computer readable storage medium having computer readable program code embodied thereon. The computer readable program code is executable by a processor to perform a method. The method includes: obtaining a software problem of a questioning user; obtaining from other users multiple solutions for solving the software problem, each of the multiple solutions being provided as a recording script, and each of the recording scripts includes a user operation sequence and a corresponding semantic node sequence, wherein one or more semantic nodes in each of the semantic node sequences describes meanings of user operations; analyzing semantic node sequences in the recording scripts of the multiple solutions to determine recommendation degree information for the multiple solutions; and outputting the multiple solutions and the associated recommendation degree information.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
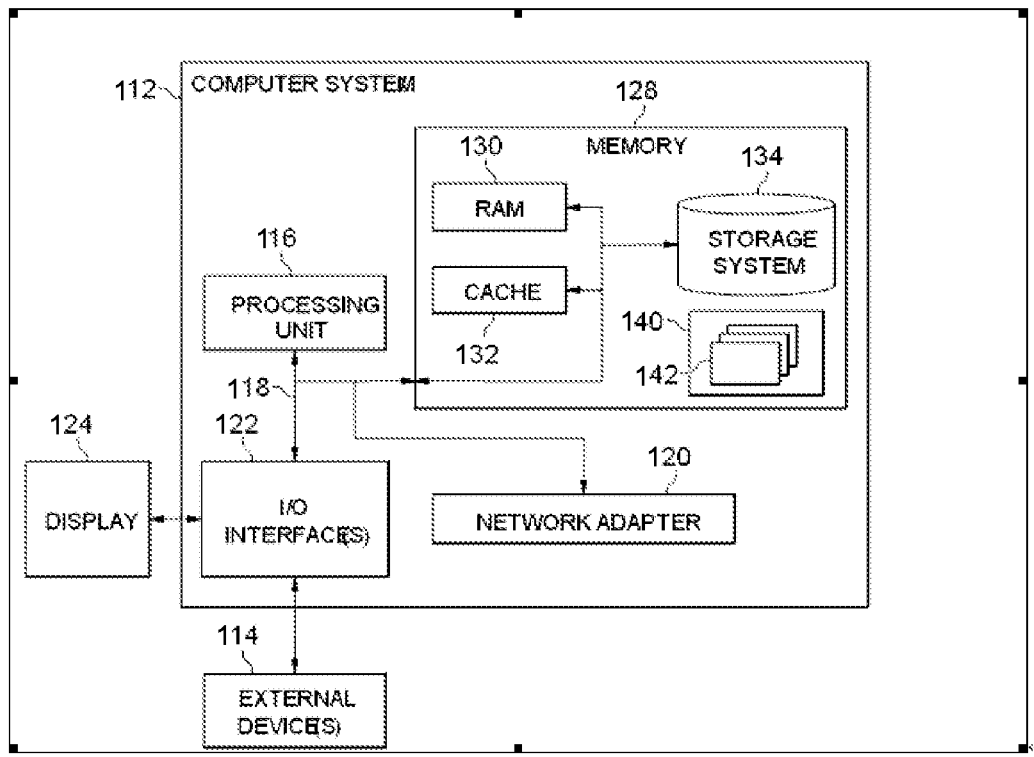
FIG. 1 shows an exemplary computer system or server that may be used to implement a system according to some embodiments of this disclosure.

Some illustrative embodiments will be described in more detail with reference to the accompanying drawings, in which the illustrative embodiments of the present disclosure have been illustrated. However, the present disclosure can be implemented in various manners, and thus should not be construed as limited to the embodiments disclosed herein. To the contrary, these embodiments are provided for the thorough and complete understanding of the present disclosure, so as to convey the scope of the present disclosure to those skilled in the art.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system 112, such as a server, is shown, such a computer system 112 may be used to implement some aspects of this disclosure. Computer system 112 is only illustrative and is not intended to suggest any limitation as to the scope of use or functionality of embodiments of the disclosure described herein.

As shown in FIG. 1, computer system 112 is in the form of a general-purpose computing device. The components of computer system 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 112 may include a variety of computer-readable media. Such media may be any available media that is accessible by computer system 112, and it includes both volatile and non-volatile media, removable and non-removable, and transitory and non-transitory media.

System memory 128 can include computer-readable media in the form of volatile memory, such as random access memory (RAM) 130 and/or cache memory 132. Computer system 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 1142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system 112 may also communicate with one or more external devices 114 such as a keyboard, a pointing device, a display 124, etc.; one or more devices that enable a user to interact with computer system 112; and/or any devices (e.g., network card, modem, etc.) that enable computer system 112 to communicate with one or more other computing devices. Such communication can occur via Input/Output (I/O) interfaces 122. Still yet, computer system 112 can communicate with one or more networks such as a local area network (LAN), a general wide area network (WAN), and/or a public network (e.g., the Internet) via network adapter 120. As depicted, network adapter 120 communicates with the other components of computer system 112 via bus 118. It should be understood that although not shown, other hardware and/or software components could be used in conjunction with computer system 112. Examples, include, but are not limited to: microcode, device drivers, redundant processing units, external disk drive arrays, RAID systems, tape drives, and data archival storage systems, etc.

Below, embodiments of this disclosure are described with reference to figures and concrete examples. According to embodiments, when a questioning user faces a software problem, he can post the problem to a help platform, and the help platform may solicit or crowd source solutions for the software problem from other users. To help the user identify a correct solution from multiple solutions, semantic nodes may be introduced in the solutions submitted by other users to indicate meanings of user operations. Thus, information about similarity, correlation, or other characteristics. of solutions may be obtained by analyzing semantic nodes of the multiple solutions, so as to recommend a solution for the user based on the information.

Figure 2:
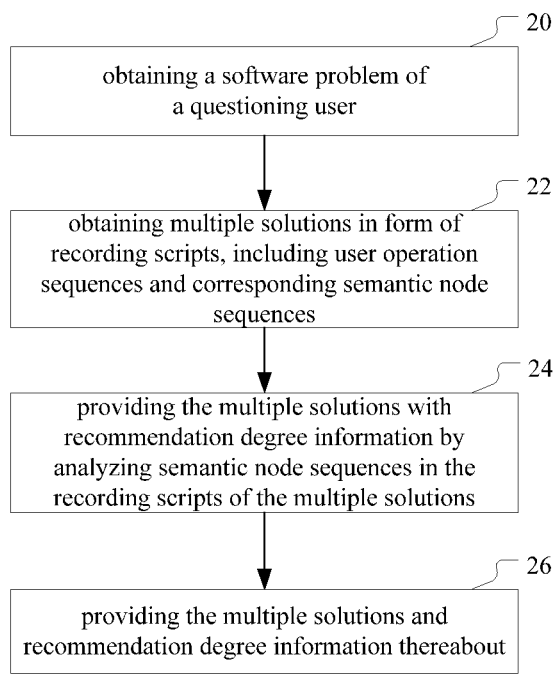
FIG. 2 shows a flow chart of a method of providing software problem solutions, according to some embodiments of this disclosure.

Now, referring to FIG. 2, a flow chart of a method for providing software problem solutions according to an embodiment of this disclosure is shown. As shown in the figure, at block 20, a software problem of a questioning user may be obtained; at block 22, multiple solutions for solving the software problem may be obtained from other users, the multiple solutions being provided in the form of recording scripts, the recording scripts including user operation sequences and corresponding semantic node sequences, wherein semantic nodes in the semantic node sequences describe meanings of user operations; at block 24, the multiple solutions are provided with recommendation degree information by analyzing semantic node sequences in the recording scripts of the multiple solutions; at block 26, the multiple solutions and recommendation degree information thereabout are provided. Below, executing manners of respective blocks above are described with reference to concrete examples.

When a user faces a software problem in process of using software, he may record and describe the problem in multiple manners and submit the problem to a help platform. Thus, the help platform may obtain the software problem submitted by the user as shown at block 20. In an embodiment, the software problem may be provided in the form of text. For instance, the questioning user may describe the operation process where a software problem arises using text in natural language and submit the text to the platform. In an embodiment, a software problem may be provided in the form of a video recording. For instance, the questioning user may employ various video recording software to record an operation process that leads to the software problem, and submit the recorded video recording to the help platform. In an embodiment, a software problem may be provided in the form of a video recording in combination with a textual specification. In this case, besides describing by video recording the operation process that leads to the software problem, the questioning user may further add a brief text to explain and annotate the software problem.

It will be appreciated that the software problem may further be provided in more forms besides the above-listed forms or based on the above-listed forms, so that other users can clearly understand the process where the software problem arises.

Based on obtaining the software problem of the questioning user in various forms at block 20, the help platform may publish the software problem to solicit solutions for the software problem. Correspondingly, other users of the help platform may provide solutions to the software problem based on understanding of the software problem above. Thus, at block 22, the help platform may obtain multiple solutions for solving the software problem from other users. In an embodiment, the solutions above are provided in form of recording scripts, which means including user operation sequences and corresponding semantic node sequences, wherein the semantic nodes describe meanings of user operations.

It will be appreciated that a solution is substantively a description of an operation process for solving the software problem above. Generally, an operation process includes a series of user operations, such as clicking a certain function button of the software, activating a certain dialog box, inputting a certain character at a specific position, or other action. In fact, different user operations may have the same operation meanings in some cases. For instance, when text editing software is used, a user operation of pressing "Ctrl" and "S" keys at the same time may have the same meaning as a user operation of pressing "save" button, which means save the current document. On the other hand, in case of different contexts, the same user operation may have different meanings. For instance, if a user has opened multiple windows when using certain software, the current activated window may be closed by using shortcut operations such as pressing "Alt" and "F4" keys; if there is only one opened window, the same shortcut operation may lead to closing the software directly. However, a conventional help platform usually cannot identify meaning of such user operations, and solutions cannot be analyzed "grammatically." Therefore, in some embodiments of this disclosure, a recording script may be employed to record an operation process, where the recording script includes not only an operation sequence in the operation process, but also a corresponding semantic node sequence, in which semantic nodes describe meanings of the user operation. Below, aspects of a method for obtaining a recording script of an operation process are described.

Figure 3:
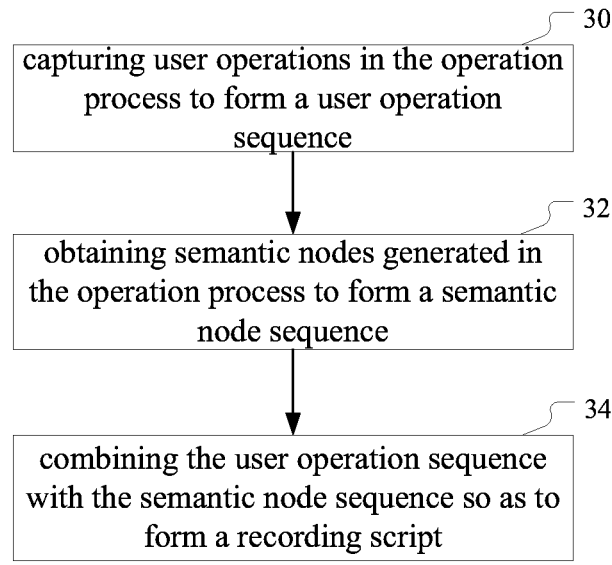
FIG. 3 shows a method flow chart for obtaining a recording script of an operation process, according to some embodiments of this disclosure.

FIG. 3 shows a method flow chart for obtaining a recording script of user operations in an operation process of a provided solution, according to some embodiments. It will be understood that this method is illustrative only, and does not limit the scope of the various embodiments of this disclosure. As shown in FIG. 3, at block 30, for an operation process, user operations in the operation process may be captured to form a user operation sequence; at block 32, semantic nodes generated in the operation process may be obtained to form a semantic node sequence; at block 34, the user operation sequence may be combined with the semantic node sequence so as to form the recording script.

Concretely, at block 30, user operations in the process of using the software may be captured using various recording tools. It will be appreciated that the prior art has provided various kinds of recording tools to capture operations of a user by monitoring interactions between the user and a software API. Such recording tools may be employed to perform aspects of block 30.

At block 32, multiple manners may be employed to obtain the above mentioned semantic nodes. According to an embodiment, the software may be preconfigured to provide semantic nodes in an executing process. For example, stub codes may be provided at specific positions of executable codes of the software, and the stub codes may be configured to output information related to the executed operations and executing state of the software. The specific positions where the stub codes are inserted may correspond to meaningful and important software operations executed in response to the user operations. Thus, each time when the software executes a stub code, information of the executed operations and executing state of the software that may describe and explain meanings of the user operations may be outputted. The stub codes may be configured to output the information above to a specific storage position. Therefore, information of the above-mentioned executed operations and executing state outputted in the operation process of the software may be read from the specific storage position as semantic nodes. According to another embodiment, a code analyzer is provided. The code analyzer may be trained using a heuristic algorithm, so that it can analyze source codes or intermediate codes of the software and insert the stub codes at specific positions of the source codes or intermediate codes. Thus, the software may output information of the executed operations and executing state similarly to the previous embodiment after being instrumented using the code analyzer. In another embodiment, the code analyzer may be configured to analyze runtime environment of the software and acquire information related to the executed operations and executing state of the software from the runtime environment as semantic nodes. In other embodiments, the above implementation manners may further be combined.

In an embodiment, the above-mentioned software is a client software interacting with a server. In such a case, user operations on the client software may further be associated with execution of the server. For example, the user operations may cause client software to send a request to the server. The server may then process the request and return a response to the client. In such a case, the server may be configured such that at least a part of the semantic nodes is output or provided by the server and transmitted to the client via various transmission protocols. In an example, the server may include the semantic nodes in a responding Hypertext Transfer Protocol (HTTP) header. Thus, semantic nodes provided by the server may be obtained by capturing the response returned from the server.

As mentioned above, the semantic nodes may include information related to the executed operations and executing state of the software for describing and explaining meanings of the user operations. For example, a user operation of pressing "Ctrl" and "S" keys at the same time and a user operation of pressing "save" button may make the software execute the same code segment. According to the above embodiments, each time when the software executes the code segment, information of executed operations (for example, the software executes a save operation) and information of executing state (such as the saved objects and the saved positions) at the time may be outputted as semantic nodes. Furthermore, the semantic node may include some attribute information so as to identify or distinguish the semantic nodes as well as corresponding software execution environment. More specifically, for example, the semantic nodes may include node IDs to identify the semantic nodes. Furthermore, the semantic nodes may be given one or more of the following attributes: importance, code positions, software information, timestamp etc. The importance may indicate a degree of importance of the semantic nodes; the code position may indicate positions of the semantic nodes in the software application; the software information may include information related to the software itself, such as software ID, version etc.; and the timestamp may indicate the time when the semantic nodes are generated. It will be appreciated that the contents of the semantic nodes may be modified variously according to design requirements, as long as the obtained semantic nodes may describe meanings of user operations.

According to the manner described above, semantic nodes generated in the operation process may be obtained at block 32, so as to form a semantic node sequence. Furthermore, at block 34, the user operation sequence obtained at block 30 may be combined with the semantic node sequence obtained at block 32, so as to form a recording script of the operation process. In an embodiment, respective semantic nodes in the semantic node sequence may be inserted into corresponding positions of the user operation sequence, so as to form the recording script. In another embodiment, the semantic node sequence and the user operation sequence may be combined and ordered, and the aggregation of the two sequences may be taken as the recording script. Although blocks 30-34 are shown in FIG. 3 as being performed in order, this need not be required. In some embodiments, block 30 and block 32 may be performed in parallel.

The method of FIG. 3 may be used to obtain a recording script of an operation process. Such a recording script corresponding to a solution may be obtained by applying the method of FIG. 3 to an operation process of the solution, such as in performing block 22 in FIG. 2. According to an embodiment, at block 22, multiple solutions may be obtained from other users of the help platform, wherein each solution is provided in the form of a recording script by the method in FIG. 3. For the multiple solutions obtained, in order to help the questioning user identify the correct solution, at block 24, semantic node sequences corresponding to the multiple solutions may be analyzed, so as to provide each solution with recommendation degree information.

Figure 4:
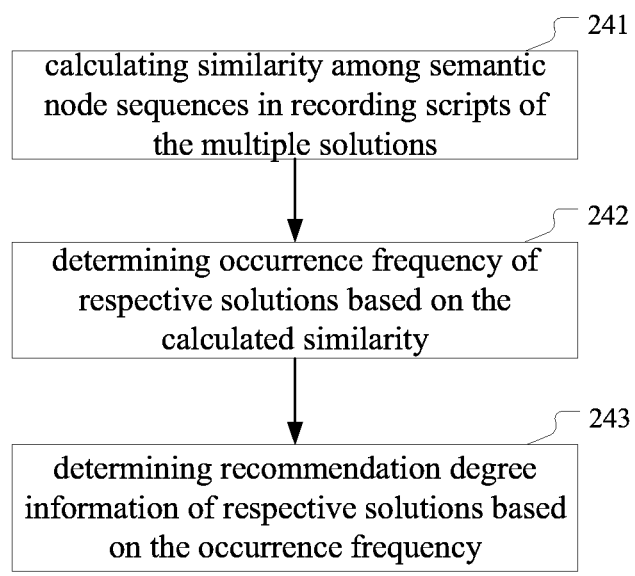
FIG. 4 shows an executing process for providing recommendation degree information, according to some embodiments of this disclosure.

FIG. 4 shows an executing process for providing recommendation degree information according to an embodiment, i.e. sub-blocks of the block 24 above. In the embodiment shown in FIG. 4, first at block 241, similarity among semantic node sequences in the recording scripts of the multiple solutions may be calculated. At block 242, occurrence frequency of respective solutions may be determined based on the calculated similarity. Then, at block 243, recommendation degree information of respective solutions may be determined based on the occurrence frequency.

As described above, respective solutions may be provided in the form of recording scripts, and the recording scripts may include user operation sequences and semantic node sequences. As semantic nodes describe meanings of user operations, the semantic node sequences may reflect substantive operation processes of corresponding solutions. Thus, two semantic node sequences may be compared to determine whether two corresponding solutions are essentially the same solution. To this end, at block 241, similarity among semantic node sequences corresponding to respective solutions may be determined.

In some embodiments, similarity between two semantic node sequences is defined as proportional to the number of common semantic nodes shared in the two semantic node sequences. For example, similarity of two semantic node sequences may be defined as the ratio of the number of common semantic nodes in the two semantic node sequences to total length of the two sequences (i.e. summation of the number of all semantic nodes in the two sequences). Alternatively, for another example, the similarity above may be defined as the ratio of the number of common semantic nodes in the two semantic node sequences to the average length of the two sequences. Correspondingly, block 241 may include calculating the number of common semantic nodes in corresponding semantic node sequences of a given two solutions and determining similarity between the two solutions based on that number.

In an embodiment, positions of semantic nodes in semantic node sequences may be further considered to calculate the similarity above. For example, block 241 may include calculating the number of the same semantic nodes at the same positions in two semantic node sequences corresponding to two solutions, and determining similarity between the two solutions according to that number. For instance, the similarity may be defined as the ratio of number of the same semantic nodes at the same positions in two semantic node sequences to the total length or average length of the two sequences.

In an embodiment, the order of semantic nodes in the semantic node sequences is further considered to calculate the similarity between two semantic node sequences above. For example, block 241 may include aligning two semantic node sequences corresponding to two solutions and determining the maximum length of a common subsequence of the two sequences, where the common subsequence is formed of multiple semantic nodes appearing in the same order in the two semantic node sequences. Then, the similarity between two semantic node sequences may be defined as ratio of the maximum length of the common subsequences to the total length or average length of the two sequences.

It will be appreciated, besides the calculating manners listed above or based on the calculating manners listed above, that other manners may be employed to calculate similarity between two semantic node sequences. Furthermore, there currently exist various algorithms to compare and determine similarity between two sequences, and such algorithms may be employed in embodiments of this disclosure and may be included in the scope of this disclosure.

Based on the determined similarity among corresponding semantic node sequences of respective solutions, at block 242, the occurrence frequency of each solution may be determined based on the calculated similarities. In an embodiment, several threshold values may be preset for the similarity. If the similarity between semantic node sequences of two solutions exceeds a first threshold value, the two solutions may be deemed as the same solution. Thus, when calculating occurrence frequency of respective solutions, a set of N solutions whose similarity therebetween exceeds the first threshold value may be deemed to be the same solution occurring for N times, and thereby occurrence frequency of the provided solutions is determined. More generally, in an embodiment, the occurrence frequency of a certain solution S may be determined as the summation of similarities between the solution S and other provided solutions.

Further, at block 243, the recommendation degree of each solution may be determined based on the occurrence frequency of that solution determined at block 242. In an embodiment, the recommendation degree of a solution may be determined as proportional to the occurrence frequency of that solution. In other words, a solution with a greater occurrence frequency may be deemed as more possible to be the correct solution, and may thus be given a higher recommendation degree, as compared to a solution with a lesser frequency. Thus, recommendation degree information is provided for respective solutions via blocks 241 to 243.

Based on the initial recommendation degree determined from the occurrence frequency above, more factors may be taken into consideration to provide further recommendation degree information. In an embodiment, the method of this disclosure may further include obtaining assessments on the multiple solutions provided by other users. For example, as to the multiple solutions obtained at block 22, other users of the help platform may verify these solutions to determine whether the solutions can solve the software problem raised by the questioning user. After the verification, users may provide their assessments on the solutions to the help platform. The assessments may be embodied as, for example, ratings, scorings, votes etc. on the solutions.

Correspondingly, the help platform may receive the assessments on the various solutions from other users to determine assessment scores of the solutions. The assessment scores may be quantized values obtained by collecting and analyzing the assessments of the other users. Thus, when determining recommendation degrees of the solutions, the platform may take the assessment scores above as one of factors considered. In an embodiment, the recommendation degree of a solution may be determined as a weighted summation of occurrence frequency and assessment score, where the respective weights of the summations may be set based on implementation, which may be based on design choices. Thereby, the occurrence frequency of a solution and associated assessments of users may be considered in combination to give the recommendation degree of a solution, so that the recommendation degree may reflect the potential correctness of the solution.

Besides the above factors for determining recommendation degree information, additional relevant factors, such as number of visits, number of playbacks, user comments etc. of a solution or of the user who provided the solution, may be considered when determining the recommendation degree, so as to further optimize the recommendation degree.

Based on the recommendation degree of the various solutions determined by analyzing the semantic node sequences, at block 26, the solutions along with the recommendation degree information thereof may be provided to the user. In an embodiment, the solutions may be ranked according to their recommendation degrees, and the solutions as well as their associated recommendation degree information may be provided according to order of that ranking. In an embodiment, solutions may be grouped according to similarity among semantic node sequences of the solutions, so that each group may include the same solution or similar solutions, where the same solutions are those solutions whose semantic node sequences have similarity therebetween exceeding the first threshold value as described above, and the similar solutions are those solution whose semantic node sequences have similarity therebetween exceeding a second threshold value but lower than the first threshold value. Thus, at block 26, the solutions and recommendation degree information thereof may be provided in groups. In other embodiments, other manners and forms may further be employed to provide solutions as well as recommendation degree information thereof for convenience of the user to browse and select the solutions.

According to the embodiment of FIG. 2, the help platform may provide the solutions with recommendation degree information by analyzing semantic node sequences in corresponding recording scripts of the solutions. Using such recommendation degree information provided, the questioning user may identify a correct solution easily, so as to solve the software problem efficiently.

Figure 5:
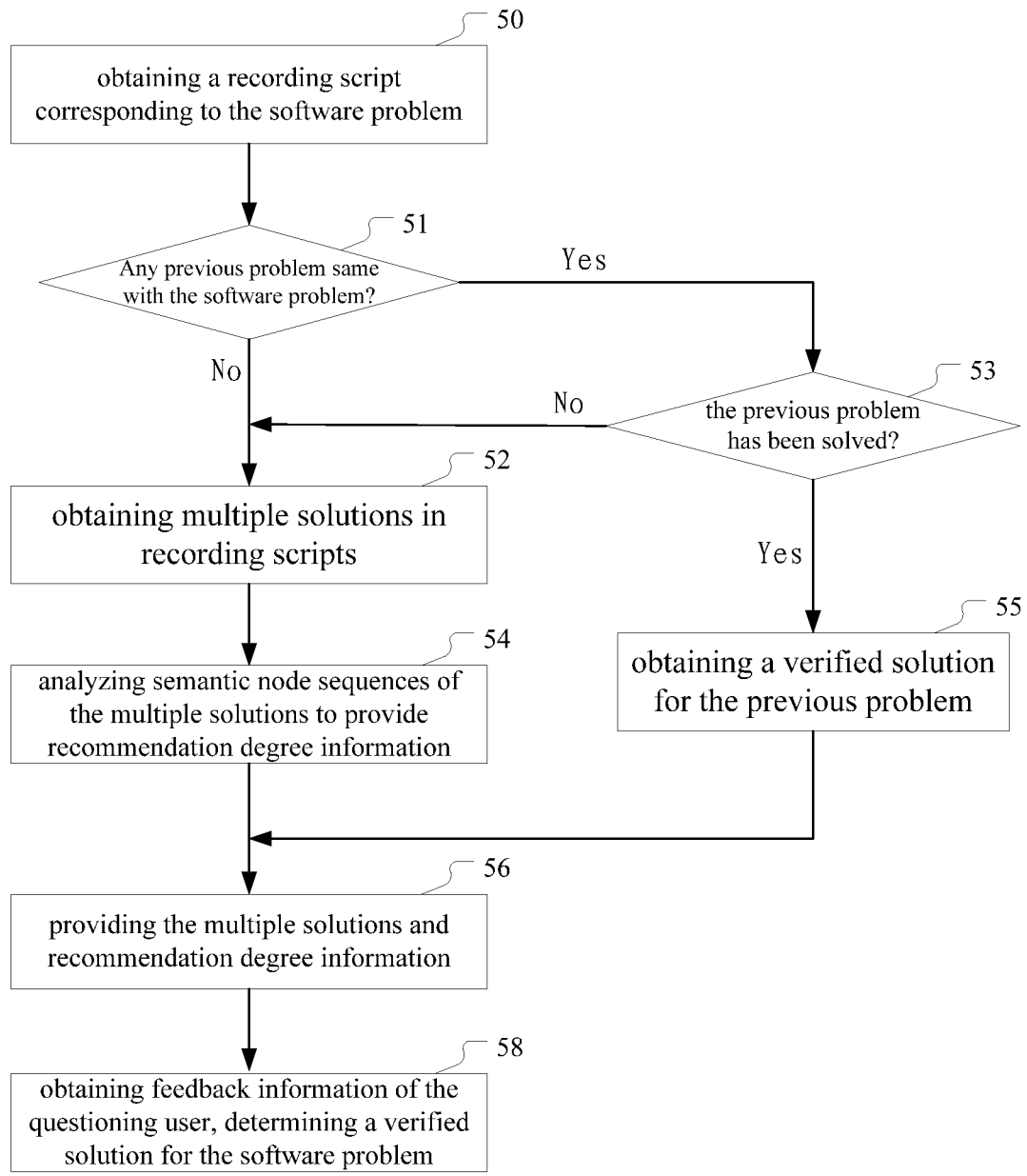
FIG. 5 shows a method flow chart for providing solutions, according to some embodiments of this disclosure.

In an embodiment, the software problem obtained at block 20 in FIG. 2 may also be provided in the form of a recording script. In this case, the help platform may analyze the software problem as well, so as to provide appropriate solutions more efficiently. FIG. 5 shows a flowchart of a method of providing solutions according to an embodiment. As shown in FIG. 5, at block 50, a recording script corresponding to the software problem may be obtained. It will be appreciated, for an operation process causing the software problem, the method as shown in FIG. 3 may also be employed to obtain the recording script of that operation process. Similarly, the recording script may include a user operation sequence and a semantic node sequence corresponding to the operation process of the software problem. Then, at block 51, it may be determined whether a problem the same as, or similar to, the current software problem exists in the previously obtained problems by analyzing the semantic node sequence of the current software problem as compared to the semantic node sequences of previously submitted software problems. For example, block 51 may be performed by calculating similarity between the semantic node sequence of the current software problem and the semantic node sequences of problems previously obtained by the help platform. If there is a certain previous problem whose semantic node sequence has similarity with the semantic node sequence of the current software problem exceeding a predetermined threshold value, it may be deemed that the previous problem is a problem the same as the current software problem. If such a previous problem does not exist, it may be deemed that there is no previously submitted problem the same as the current software problem.

In response to a determining result of "no" at block 51, which means that there is no previous problem the same as the current software problem, the method of FIG. 5 may perform block 52 of obtaining multiple solutions, block 54 of analyzing semantic node sequences of the multiple solutions to provide recommendation degree information, and block 56 of providing the multiple solutions and recommendation degree information thereof. Implementing manners of blocks 52, 54 and 56 may be respectively the same as those of blocks 22, 24 and 26 in FIG. 2.

In response to a determining result of "yes" at block 51, which means there is a previous problem the same as the current software problem, the method of FIG. 5 may perform block 53 to determine whether the previous problem has been solved. If the previous problem has not been solved, it still goes to block 52 to perform blocks 52, 54 and 56 as described above. If the previous problem has been solved, at block 55, a verified solution corresponding to the previous problem may be obtained. In an embodiment, the verified solution may be directly provided as the optimal solution. In another embodiment, a specific recommendation degree may be given to the verified solution, and at block 56, the verified solution along with multiple solutions collected from other users may be provided to the user. It will be appreciated that a higher recommendation degree may be given to the verified solution to indicate that the solution has been verified as a correct solution previously.

In an embodiment, based on the multiple solutions and the associated recommendation degree information, the method of this disclosure may further include block 58 of obtaining feedback information about the provided solutions from the questioning user, and determining a verified solution based on the feedback information. For example, as to the multiple solutions provided at block 56, the questioning user may verify them respectively in terms of correctness and validity. In an embodiment, the questioning user may provide the help platform with feedback information of respective solutions based on the verification results. The feedback information may include, for instance, whether the software problem has been solved, correct solution was verified, optimal solution was selected, scores of the respective solutions etc. If feedback information of the questioning user shows that the software problem has been solved, the help platform may mark the software problem as a solved problem. Furthermore, based on the feedback information above, the solution that is verified as a correct one by the questioning user may be marked as a verified solution. Such a marked verified solution may be provided directly for other questioning users when a same or similar software problem is raised subsequently.

With the method according to the above embodiments, the questioning user may raise a software problem. In that case, multiple solutions may be collected from other users, recommendation degree information may be provided for the collected solutions, so as to help the questioning user quickly locate a correct solution.

Figure 6:
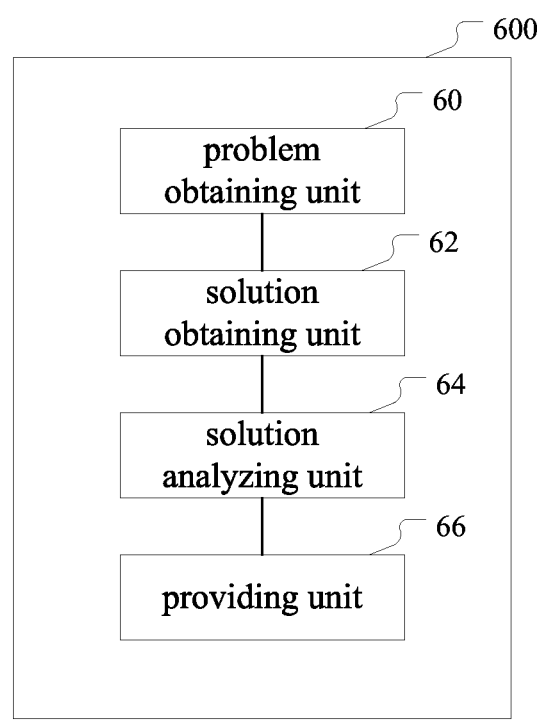
FIG. 6 shows a block diagram of an apparatus according to some embodiments of this disclosure.

Based on the same inventive idea, embodiments of this disclosure may further include an apparatus for providing software problem solutions. FIG. 6 shows a block diagram of an apparatus according to some embodiments. In FIG. 6, the apparatus for providing software problem solutions is shown as 600. As shown in the figure, the apparatus 600 may include a problem obtaining unit 60 configured to obtain a software problem of a questioning user; a solution obtaining unit 62 configured to obtain multiple solutions for solving the software problem from other users, the multiple solutions being provided in the form of recording scripts for example, the recording scripts including user operation sequences and corresponding semantic node sequences, where semantic nodes in the semantic node sequences describe meanings of user operations; a solution analyzing unit 64 configured to provide the multiple solutions with recommendation degree information by analyzing semantic node sequences in the recording scripts of the multiple solutions; and a providing unit 66 configured to provide the multiple solutions and recommendation degree information thereabout. In an embodiment, the apparatus 600 may be implemented as a help platform.

In an embodiment, the recording scripts of the multiple solutions from the other users may be provided by an operation recording unit, the operation recording unit being configured to: as to an operation process of a solution of the multiple solutions, acquire user operations in the operation process to form a user operation sequence; obtain semantic nodes generated in the operation process to form a semantic node sequence; and combine the user operation sequence with the semantic node sequence to form a recording script.

According to an embodiment, the operation recording unit may be configured to perform at least one of the following: reading information related to executed operations and executing state output from software in the operation process as semantic nodes; capturing information related to executed operations and executing state in a software runtime environment as semantic nodes; and capturing semantic nodes from a response returned from a software server.

In an embodiment, the operation recording unit may be implemented as a part of the apparatus 600, for instance, implemented as a functional component of a help platform. In an embodiment, the operation recording unit may be implemented as an independent tool for connecting and communicating with the apparatus 600 and user software. In another embodiment, the operation recording unit may be implemented as a functional component of user software, such as a plugin of user software to connect and communicate with the apparatus 600.

In an embodiment, the solution analyzing unit includes: a similarity calculating module configured to calculate similarity among semantic node sequences in recording scripts of the multiple solutions; a occurrence frequency calculating module configured to determine an occurrence frequency of the solutions based on the calculated similarities; and a recommendation degree determining module configured to determine recommendation degree information of the solutions based, for example, on the occurrence frequencies. None of the modules above is shown in FIG. 6.

According to an embodiment, the similarity calculating module is configured to calculate number of common semantic nodes shared in two semantic node sequences corresponding to any two solutions in the multiple solutions, and determine similarity of the two solutions based on the number.

In an embodiment, the apparatus 600 may further include an assessment obtaining unit (not shown) configured to obtain assessments on the multiple solutions from other users, and the solution analyzing unit may be further configured to provide recommendation degree information based on the assessments.

In an embodiment, the providing unit 66 may be configured to rank the respective solutions according to the recommendation degree information, and to provide the respective solutions and recommendation degree information thereabout according to the ranking order.

In an embodiment, the software problem may be provided in a recording script. In this case, according to an embodiment, the apparatus 600 may further include a problem analyzing unit (not shown) configured to analyze a semantic node sequence in the recording script of the software problem to determine whether there is a previous problem that is the same as the software problem. In response to identifying a previous problem that is the same as the software problem, the problem analyzing unit may obtain a verified solution corresponding to the previous problem.

According to an embodiment, the apparatus 600 may further include a feedback obtaining unit (not shown) configured to obtain feedback information from the questioning user about the multiple solutions, and to determine a verified solution corresponding to the software problem based on the feedback information.

Example executing manners of the apparatus 600 are included above in the description of the above-described method.

Using the method and apparatus of embodiments of this disclosure, multiple solutions may be collected for a given software problem, and the collected multiple solutions may be analyzed to provide recommendation degree information. Thus, the questioning user can quickly identify a correct solution according to the recommendation degree information, and thus solve the problem efficiently.

The flowcharts and block diagrams in the figures illustrate the architecture, functionality, and operation of some possible implementations of systems, methods, and computer program products according to various embodiments of this disclosure. In this regard, each block in the flowchart or block diagrams may represent a module, segment, or portion of code, which includes one or more executable instructions for implementing the specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and flowchart illustrations, and combinations of blocks in the block diagrams and flowchart illustrations, may be implemented by special purpose hardware-based systems that perform the specified functions or acts, or combinations of special purpose hardware and computer instructions.

The descriptions of the various embodiments of this disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing software problem solutions, the method comprising:
   obtaining a software problem of a questioning user;
   obtaining, from other users, multiple solutions for solving the software problem, each of the multiple solutions being provided as a recording script, and each of the recording scripts includes a user operation sequence and a corresponding semantic node sequence, wherein one or more semantic nodes in each of the semantic node sequences describes meanings of user operations;

analyzing, by a computer processor, the semantic node sequences in the recording scripts of the multiple solutions to determine recommendation degree information for the multiple solutions; and outputting the multiple solutions and the associated recommendation degree information.

2. The method according to claim 1, wherein a first recording script of a first solution of the multiple solutions is provided by:

capturing user operations in the operation process of the first solution to form a first user operation sequence;

obtaining semantic nodes generated in the first operation process to form a first semantic node sequence; and combining the first user operation sequence with the first semantic node sequence so as to form the first recording script.

3. The method according to claim 2, wherein obtaining the semantic nodes generated in the first operation process comprises at least one of reading information related to executed operations and executing state output from software in the first operation process as semantic nodes; capturing information related to executed operations and executing state in a software runtime environment as the semantic nodes; and capturing the semantic nodes in a response returned from a software server.

4. The method according to claim 1, wherein analyzing the semantic node sequences in the recording scripts of the multiple solutions to determine the recommendation degree information for the multiple solutions comprises:

calculating one or more similarities among the semantic node sequences in the recording scripts of the multiple solutions;

determining an occurrence frequency of each of the multiple solutions based at least in part on the calculated similarities; and determining recommendation degree information of the multiple solutions based on the occurrence frequencies of the multiple solutions.

5. The method according to claim 4, wherein calculating the similarities among the semantic node sequences in the recording scripts of the multiple solutions comprises:

calculating a quantity of common semantic nodes shared in two semantic node sequences corresponding to two solutions in the multiple solutions; and determining a similarity of the two solutions based on the quantity.

6. The method according to claim 4, further comprising:

obtaining from the other users one or more assessments on the multiple solutions; and providing the recommendation degree information based on the assessments.

7. The method according to claim 1, wherein analyzing the semantic node sequences in the recording scripts of the multiple solutions to determine the recommendation degree information for the multiple solutions comprises:

ranking the multiple solutions in a ranking order according to the recommendation degree information; and providing the multiple solutions and the recommendation degree information according to the ranking order.

8. The method according to claim 1, wherein the software problem is provided as a recording script.

9. The method according to claim 8, further comprising:

analyzing a semantic node sequence in the recording script of the software problem to determine whether there is a previous problem that is the same as the software problem; and obtaining a verified solution corresponding to the previous problem, in response to identifying the previous problem that is the same as the software problem.

10. The method according to claim 1, further comprising:

obtaining from the questioning user feedback information about the multiple solutions; and determining a verified solution corresponding to the software problem based at least in part on the feedback information.

11. An apparatus for providing software problem solutions, the apparatus comprising:

a problem obtaining unit configured to obtain a software problem of a questioning user;

a solution obtaining unit configured to obtain, from other users, multiple solutions for solving the software problem, each of the multiple solutions being provided as a recording script, and each of the recording scripts includes a user operation sequence and a corresponding semantic node sequence, wherein one or more semantic nodes in each of the semantic node sequences describes meanings of user operations;

a solution analyzing unit configured to analyze the semantic node sequences in the recording scripts of the multiple solutions to determine recommendation degree information for the multiple solutions; and a providing unit configured to output the multiple solutions and the associated recommendation degree information.

12. The apparatus according to claim 11, wherein a first recording script of a first solution of the multiple solutions is provided by an operation recording unit, the operation recording unit being configured to:

capture user operations in the operation process of the first solution to form a first user operation sequence;

obtain semantic nodes generated in the first operation process to form a first semantic node sequence; and combine the first user operation sequence with the first semantic node sequence so as to form the first recording script.

13. The apparatus according to claim 12, wherein obtaining the semantic nodes generated in the first operation process comprises at least one of reading information related to executed operations and executing state output from software in the first operation process as semantic nodes; capturing information related to executed operations and executing state in a software runtime environment as the semantic nodes; and capturing the semantic nodes in a response returned from a software server.

14. The apparatus according to claim 11, wherein the solution analyzing unit comprises:

a similarity calculating module configured to calculate one or more similarities among the semantic node sequences in the recording scripts of the multiple solutions;

a occurrence frequency calculating module configured to determine an occurrence frequency of each of the multiple solutions based at least in part on the calculated similarities; and a recommendation degree determining module configured to determine recommendation degree information of the multiple solutions based on the occurrence frequencies of the multiple solutions.

15. The apparatus according to claim 14, wherein the similarity calculating module is further configured to:
  calculate a quantity of common semantic nodes shared in two semantic node sequences corresponding to two solutions in the multiple solutions; and
  determine a similarity of the two solutions based on the quantity.

16. The apparatus according to claim 14, further comprising:
  an assessment obtaining unit configured to obtain from the other users one or more assessments on the multiple solutions;
  wherein the solution analyzing unit further being configured to provide the recommendation degree information based on the assessments.

17. The apparatus according to claim 11, wherein the providing unit is configured to rank the multiple solutions in a ranking order according to the recommendation degree information, and to provide the multiple solutions and the recommendation degree information thereabout according to the ranking order.

18. The apparatus according to claim 11, wherein the software problem is provided as a recording script, the apparatus further comprising a problem analyzing unit configured to:
  analyze a semantic node sequence in the recording script of the software problem to determine whether there is a previous problem that is the same as the software problem; and
  obtain a verified solution corresponding to the previous problem, in response to identifying the previous problem that is the same as the software problem.

19. The apparatus according to claim 11, further comprising a feedback obtaining unit configured to obtain from the questioning user feedback information about the multiple solutions, and to determine a verified solution corresponding to the software problem based at least in part on the feedback information.

20. A computer program product comprising a computer readable storage medium having computer readable program code embodied thereon, the computer readable program code executable by a processor to perform a method comprising:
  obtaining a software problem of a questioning user;
  obtaining, from other users, multiple solutions for solving the software problem, each of the multiple solutions being provided as a recording script, and each of the recording scripts includes a user operation sequence and a corresponding semantic node sequence, wherein one or more semantic nodes in each of the semantic node sequences describes meanings of user operations;
  analyzing the semantic node sequences in the recording scripts of the multiple solutions to determine recommendation degree information for the multiple solutions; and
  outputting the multiple solutions and the associated recommendation degree information.

* * * * *